United States Patent [19]

Yada et al.

[11] Patent Number: 4,627,985

[45] Date of Patent: Dec. 9, 1986

[54] PROCESSED SOYBEAN FOODS AND THEIR PRODUCTION

[75] Inventors: Hideo Yada, Settsu; Kunihisa Akaba, Iida; Megumi Mukaiyama, Shimoina, all of Japan

[73] Assignees: Takeda Chemical Industries, Ltd., Osaka, Japan; by said Hideo Yada; Asahi-Matsu Foods Inc., Nagano, Japan; by said Kunihisa Akaba and Megumi Mukaiyama

[21] Appl. No.: 602,721

[22] Filed: Apr. 23, 1984

[30] Foreign Application Priority Data

Apr. 25, 1983 [JP]  Japan ................. 58-73602

[51] Int. Cl.$^4$ ............................. A23L 1/20; A23J 3/00
[52] U.S. Cl. .............................. 426/92; 426/93; 426/302; 426/634; 426/802
[58] Field of Search .............. 426/93, 302, 305, 309, 426/92, 634, 96, 293

[56] References Cited

U.S. PATENT DOCUMENTS

| | | | |
|---|---|---|---|
| 3,704,133 | 11/1972 | Kracauer | 426/93 |
| 3,712,821 | 1/1973 | Ronsivalli et al. | 426/643 X |
| 3,808,341 | 4/1974 | Rongey et al. | 426/305 X |
| 3,830,941 | 8/1974 | Luft et al. | 426/93 X |
| 4,001,441 | 1/1977 | Liepa | 426/302 X |
| 4,204,005 | 5/1980 | Kudo et al. | 426/518 |
| 4,251,551 | 2/1981 | VanHulle et al. | 426/302 X |
| 4,362,752 | 12/1982 | Sugino et al. | 426/643 X |
| 4,423,083 | 12/1983 | Shenouda | 426/802 X |

*Primary Examiner*—Robert Yoncoskie
*Attorney, Agent, or Firm*—Wenderoth, Lind & Ponack

[57] ABSTRACT

A fibrous or granular processed soybean food can be produced by coating the surfaces of fibrous or granular soybean preparation obtained by grinding soybeans having a water content of 30 to 60% with one or more members selected from the group consisting of fish-paste, cheese and egg in the form of an aqueous slurry. Since said soybean food has been given a good flavor, taste and texture, it can be appropriately used as an ingredient in a variety of foods or as a snack food.

2 Claims, No Drawings

PROCESSED SOYBEAN FOODS AND THEIR PRODUCTION

This invention relates to a processed soybean food coated with one or more members selected from the group consisting of fish-paste, cheese and egg.

Recently fibrous or granular vegetable textured proteins have been used in the production of various processed. foods. On the ground that soybean protein is good for health, this protein source has been gathering particular attention and it is expected that soybean-derived vegetable protein will become a more and more important raw material of foodstuffs. However, the vegetable textured proteins available today are not as satisfactory as desired in flavor and palatability, and their use has been fairly limited.

The present inventors conducted studies to solve the problems and previously developed a new textured (fibrous or granular) soybean preparation by way of the technique disclosed in Japanese Patent Publication (examined) No. 9099/1981 or U.S. Pat. No. 4,204,005. This preparation has already been utilized in the production of various processed foods. However, the present inventors conducted further studies to broaden the variety of flavor and palatability of such preparation and completed this invention.

It is an object of the present invention to provide a fibrous or granular processed soybean food having one or more members selected from the group consisting of fish-paste, cheese and egg, said members being coated on the surfaces of fibrous or granular soybean preparations obtained by grinding soybeans having a water content of 30 to 60% by weight.

It is another object of the present invention to provide a method for production of a fibrous or granular processed soybean food, which comprises coating the surfaces of fibrous or granular soybean preparations obtained by grinding soybeans having a water content of 30 to 60% by weight with a slurry of one or more members selected from the group consisting of fish-paste, cheese and egg.

The fibrous or granular soybean preparation which is used in accordance with this invention may be one manufactured by the technique described in Japanese patent publication (examined) No. 9099/1981 or U.S. Pat. No. 4,204,005 referred to above. The term "fibrous" as used in the present invention implies all of long-staple and short-staple types of fibers, inclusive of flat or flake configuration. As will be described hereinafter, when such a fibrous or granular soybean preparation is used in a state containing about 20% or less of water, the coating procedure according to this invention is facilitated and the resultant fibrous or granular processed soybean food is satisfactory in shape. The slurry of fish-paste, cheese or egg which are employed in accordance with this invention may for example be those prepared as follows.

The fish-paste ("Surimi" in the Japanese language) is usually a preparation made by grinding the meat and other edible parts of fish, shellfish, crustaceous creatures, etc. in the conventional manner. For example, milled flesh of walleye pollack, croaker, lizard fish, Akta mackerel, cutlass fish, horse mackerel, etc. and milled meats of shrimps, lobsters, crabs, sea-urchins, etc. are mentioned. The cheese may for example be natural cheese, processed cheese, cheese food or the like. The egg may for example be a hen's egg, a quail's egg or a duck's egg in the form of whole, yolk or white.

In the method according to this invention, the above-mentioned fish-paste, cheese or egg is first made into an aqueous slurry having a viscosity of 10 centipoises to $1 \times 10^4$ poises and the surfaces of the fibers constituting said fibrous soybean preparation are coated with the same slurry.

The slurry of fish-paste, cheese or egg having the above-mentioned viscosity is prepared by mixing the material thoroughly to a water content of 85 to 95% by weight in the case of fish-paste, 60 to 80% by weight in the case of cheese and 30 to 95% by weight in the case of egg. If necessary, condiments, flavors, colors, gums, etc. may be added in suitable amounts.

If the viscosity of said slurry is higher than the above-mentioned range, a sufficiently fluid slurry cannot be obtained and, therefore, the surface of the fibrous or granular soybean preparation cannot be uniformly coated. If the viscosity of said slurry is too low, the slurry applied to the fibrous or granular soybean preparation renders the surface tacky so that the individual pieces of the preparation are intertwined to form blocks, thus failing to give the desired product.

In the coating procedure according to this invention, the fibrous or granular soybean preparation is contacted with said slurry, taking advantage of the water-absorptive capacity of said soybean preparation. Thus, the soybean preparation absorbs the water contained in said slurry so that the fish-paste, cheese or egg is uniformly deposited on the surface of each piece of the soybean preparation in such a manner that the individual pieces of said soybean preparation will not stick to each other. For this purpose, it is advantageous to ensure that the soybean preparation has a low water content of 20% or less so that it may have a sufficient water-absorptive capacity. The coating is preferably prepared by mixing about 50 to 250 g of fish-paste, about 150 to 350 g of cheese or about 50 to 500 g of egg per 1 kg of said soybean preparation, on all dry bases. If the amount of the coating material is less than the above-mentioned level, a sufficient amount of fish-paste, cheese or egg is not applied so that the resultant product will not be as satisfactory as desired in flavor and palatability. In case the amount of the coating material is over the above-mentioned level, the soybean preparation forms blocks to give an unsatisfactory product. The coating is preferably carried out by mixing said slurry with said soybean preparation, using a stirring machine such as the universal stirring machine equipped with one or two hook type-paddles, for about 5 to 30 minutes. Generally, when the water content of the coated product is less than 60% after completion of coating, the individual pieces do not interlace, giving rise to a product having an attractive appearance.

The product thus coated may be dried to a water content of about 10% or less or heat-treated as necessary. By such drying procedure, the product remains fresh at room temperature for a long time and the dried product can be reconstituted with an appropriate amount of water to regain the pre-drying flavor and palatability. When cheese is coated, the coated product may be heated in a microwave oven, for instance, in which case the coated cheese is melted and forms a thin film. Thus obtained products will assume a satisfactory appearance and have a soft palatable texture.

The fibrous or granular soybean food obtained in accordance with this invention is such that the material fibrous or granular soybean preparation remains in the original shape and condition and, yet, has been given a flavor and taste of fish meat, cheese or egg and that the product has a texture resembling fish meat, cheese or egg. The product can be used in a variety of food applications, including the use thereof as a snack food. For example, it is appropriately used as an ingredient in salads, croquettes, hamburger steaks, meat patties, mashed potatoes, scrambled egg, soups or noodles etc. For example, the product of the present invention may be employed in an amounts (as dried matter) of about 5 to 30%, preferably 8 to 20%, in salads; about 1 to 20%, preferably 3 to 10% in croquettes; about 1 to 25%, preferably 2 to 15% in hamburger steaks; about 5 to 30%, preferably 8 to 20% in mashed potatoes; about 5 to 30%, preferably 8 to 20% in scrambled eggs.

When it has a coat of cheese, the product can be also used as a delicious snack food. The product coated with egg, especially in the flake configuration, is suitable as an ingredient of soups or chinese noodles.

The following examples are further illustrative of the invention.

EXAMPLE 1

Whole grains of soybeans in the amount of 2 kg were immersed in tap water for 5 hours to a water content of 52% by weight and, then, treated with pressurized steam for 3 minutes. The pretreated soybean was continuously introduced into colloid mill (MK-Z-10, manufactured by Masuko Industry, Japan) with the distance between grinding disks adjusted to 0.1 mm and revolving at 1800 r.p.m., while a sorkitol solution was dripped onto the feed in a proportion of 2% by weight on a dry basis. The fibrous soybean preparation having an average fiber length of 5 to 30 mm which emerged from the mill was dried in circulating air dryer at 75° C. to give 2 kg of dry fibrous soybean preparation (water content: 10%).

To 640 g of shrimp meat was added 500 ml of water and the mixture was milled in a mixer to give a ground shrimp meat slurry having a viscosity of $5 \times 10^2$ poises. This slurry was added to 1 kg of the above fibrous soybean preparation and the mixture was stirred in the stirring machine (Universal Stirring Machine; Model: 25 AMV-rr, manufactured by Shinagawa Industry, Japan)so as to coat the surfaces of fibers with the milled shrimp meat. The product (water content: 50%) was then dried to give a dry shrimp meat-coated product. When this product was reconstituted with twice its amount of water, it returned to the pre-drying condition to present an elastic palatability which was suited to its use as a material for croquettes. The product could be preserved at room temperature for more than 8 months and was very desirable in this respect, too.

EXAMPLE 2

To 640 g of crab meat was added 2,500 ml of water and the mixture was milled in a mixer. It was further mixed with 10 g of New-Umamix ® (manufactured by Takeda Chemical Industries, Ltd.), 10 g of monosodium L-glutamate, 1 g of Ribotide ® (Takeda Chemical Industries,Ltd., Japan), 9 g of common salt, 4 g of crab flavor J 202 (manufactured by Hasegawa Flavor Co., Ltd., Japan) and 1 g of Food red No. 102, and the mixture was ground to give a ground crab meat slurry having a viscosity of 5 poises. This slurry was added to 2.5 kg of the dried fibrous soybean preparation prepared in the same manner as Example 1 and the mixture was stirred in the stirring machine (Universal Stirring Machine) so as to coat the surface of soybean pieces with the ground crab meat. The product (water content: 55%) was heated in a steam oven and, then, loosened gently to give a fibrous food coated with crab meat. Using this product, croquettes were prepared in the routine manner.

As a control run, crab croquettes were prepared using uncoated fibrous soybeans and crab meat, and the two products were compared with each other for quality. The quality evaluation was made by a panel of 20 tasters and the sensory evaluation parameters of appearance, palatability and flavor were rated on the following scale.

| -3 | -2 | -1 | 0 | +1 | +2 | +3 |
|---|---|---|---|---|---|---|
| Very poor | Moderately poor | Slightly poor | Ordinary | Slightly good | Moderately good | Very good |

The mean scores by the 20 panelists are presented in the following table.

| Fibrous soybeans | Appearance | Palatability | Flavor |
|---|---|---|---|
| Uncoated | +2.3 | -0.5 | +0.5 |
| Coated | +2.5 | +2.6 | +2.3 |

It will be apparent from the above scores that the crab croquette prepared by the use of the product of this invention was superior qualitywise to the control food, especially in palatability and flavor.

EXAMPLE 3

Whole grains of soybeans in the amount of 2 kg were immersed in tap water for 8 hours to a water content of 58% by weight and treated with pressurized steam for 1 minute. The steamed soybean was then introduced continuously into a colloid mill (MK-Z-10, Masuko Industry) with the distance between grinding disks adjusted to 0.01 mm and revolving at 1300 r.p.m. The flat soybean preparation having an average length of 3 to 50 mm and an average width of 10 mm as discharged from the exit of the mill was dried in a circulating air dryer at 85° C. to give 1.9 kg of dry flat soybean preparation (water content: 10%).

To 900 g of ground meat of walleye pollack was added 700 ml of water and the mixture was milled in a mixer to prepare a ground fish meat slurry having a viscosity of $3.5 \times 10^3$ poises. This slurry was added to 1 kg of the above dry flat soybean preparation and the mixture was stirred in the stirring machine (Universal Stirring Machine) to coat the surfaces of soybean pieces with the ground fish meat. The product (water content: 57%) was heated in a steam oven, loosened gently and dried to give a flat-fibrous dry food coated with the ground fish meat. When this dry product was reconstituted with twice its amount of water, it regained its original condition, assuming an elastic palatability suitable for use as an ingredient of salads. The product could be stored at room temperature for more than 8 months and was excellent in this respect, too.

EXAMPLE 4

Two kilograms of soybeans were immersed in tap water for 1 hour to a water content of 38% by weight and, then, treated with pressurized steam for 2 minutes.

The steamed soybean was introduced continuously into a colloid mill (MK-Z-10, Masuko Industry) with the distance between grinding disks adjusted to 0.06 mm and revolving at 1000 r.p.m. The granular soybean preparation 5 mm in diameter as discharged from the mill was dried in a circulating air dryer at 90° C. to give 1.9 g of dried granular soybean product (water content: 10%).

To 200 g of ground meat of croaker was added 160 ml of water, followed by milling in a mixer to prepare a ground fish meat slurry having a viscosity of $1\times 10^3$ poises. This slurry was added to 1 kg of the above dried granular soybean preparation and the mixture was stirred in the stirrer (Universal Stirring Machine). By the above procedure was obtained a granular soybean food (water content: 30%) coated with croaker flesh. This product had a very elastic feel in the mouth suitable for use as an ingredient of croquesttes or mashed potatoes.

EXAMPLE 5

To 250 g of processed cheese was added 200 ml of water, followed by milling in a mixer to give a slurry having a viscosity of $2\times 10^2$ poises. This slurry was added to 1 kg of a dried granular soybean preparation obtained in the same manner as Example 4 and the mixture was stirred in the stirrer (Universal Stirring Machine) to coat the surface of each individual soybean piece with cheese. The product (water content: 28%) was heated in a microwave oven, loosened gently and dried to give a dry cheese-coated granular food. This product was excellent in flavor and palatability and suited as a snack food.

EXAMPLE 6

To 750 kg of Gouda cheese was added 375 ml of water and the mixture was milled in a mixer to give a slurry having a viscosity of $9\times 10^2$ poises. This slurry was added to 1 kg of a dried fibrous soybean preparation obtained in the same manner as Example 1 and the mixture was stirred in the stirrer (Universal Stirring Machine) to coat the surfaces of individual soybean pieces with cheese. The product (water content: 36%) was heated in a microwave oven, loosened up gently and dried to give a dry cheese-coated fibrous food. This product was excellent in flavor and palatability, being a very delicious snack food.

EXAMPLE 7

To 200 g of ground meat of walleye pollack was added 160 ml of water, followed by milling in a mixer to prepare a ground fish meat slurry having a viscosity of $2\times 10^3$ poise. This slurry was added to 1 kg of the dried granular soybean preparation obtained in the same manner as Example 4 and the mixture was stirred in the stirrer (Universal Stirring Machine) to coat the surfaces of individual soybean pieces with the ground fish meat. By the above procedure was obtained a granular soybean food (water content: 30%) coated with walleye pollack meat.

Sixty grams of the granular soybean food was mixed with 600 g of beaten egg, and the mixture was fried in a fry-pan oiled with 60 g of shortening to give scrambled eggs. This product was excellent in texture.

EXAMPLE 8

To 630 g of processed cheese was added 240 ml of water, followed by milling in a mixer to give a slurry having a viscosity of $1.2\times 10^3$ poises. This slurry was added to 1 kg of a dried granular soybean preparation obtained in the same manner as Example 4 and the mixture was stirred in the stirrer (Universal Stirring Machine) to coat the surface of each individual soybean piece with cheese. The product (water content: 33%) was heated in a microwave oven, loosened gently and dried to give a dry cheese-coated granular food.

This product was suited as a material for hamburger steak.

EXAMPLE 9

To 500 g of ground meat of walleye pollack was added 750 ml of water and the mixture was milled in a mixer to prepare a ground meat slurry having a viscosity of $1\times 10^2$ poises. This slurry was added to 1 kg of the granular soybean preparation obtained in the same manner as Example 4 and the mixture was stirred in the stirrer (Universal Stirring Machine) to coat the surfaces of soybean pieces with the ground fish meat. The product (water content: 54%) was heated in a steam oven, loosened gently and dried to give a granular soybean product (water content: 8%). The product was suitable for use a material of chicken patty.

EXAMPLE 10

One kg of hen egg (fresh whole) was beaten to give a slurry having a viscosity of 10 centipoises. This slurry was added to 1 kg of flat soybean preparation obtained in the same manner as Example 3 and the mixture was stirred in the stirrer (Universal Stirring Machine) to coat the surface of each individual soybean piece with the egg. The thus obtained product (water content: 42.5%) was dried in a circulating air dryer at about 70° C. By the above procedure was obtained a flat soybean food coated with the egg. This product suited as an ingredient of soup or instant noodles.

EXAMPLE 11

To 1 kg of hen egg (whole in powder form) was added 1500 ml of water in a mixer to prepare a slurry having a viscosity of 12.5 centipoises. This slurry was added to 2.5 kg of the flat soybean preparation obtained in the same manner as Example 3 and the mixture was stirred in the universal stirring machine (Universal Stirring Machine) to coat the surfaces of each individual soybean piece with the egg. The thus obtained product (water content: 36%) was dried in a circulating air dryer at about 70° C. By the above procedure was obtained a dry egg-coated flat food. This product was suitable as an ingredient of soup or chineese noodles.

What we claim is:

1. A method of producing a fibrous or granular processed soybean food having improved flavor and palatability, which comprises coating the surfaces of fibrous or granular soybean preparation which is produced by adjusting the water content of whole grains of soybean to between 30 to 60% by weight and grinding said grains between two opposing disc grinding members separated by a gap not larger than 1 mm, wherein one of the grinding members rotates at a peripheral speed from 8 to 8000 r.p.m., and wherein the opposing discs are concave to form a central hollow portion therebetween having an approximately trapezoidal cross section with fish-paste in the form of aqueous slurry having a viscosity of 10 centipoises to $1\times 10^4$ poises, the fibrous or granular soybean preparation having a water content of 20% by weight or less at the time of coating, and the fish-paste being coated in an amount of about 50 to 250 g per 1 kg of the fibrous or granular soybean preparation, on a dry basis thereby producing said soybean food having improved flavor and palatability.

2. A fibrous or granular processed soybean food having a coating of fish-paste produced in accordance with the process of claim 1.

* * * * *